United States Patent
Hachiri

(10) Patent No.: US 12,189,485 B2
(45) Date of Patent: Jan. 7, 2025

(54) AIRPLANE FLIGHT DATA BACKUP SYSTEM

(71) Applicant: Panasonic Intellectual Property Management Co., Ltd., Osaka (JP)

(72) Inventor: Yuta Hachiri, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 167 days.

(21) Appl. No.: 17/879,994

(22) Filed: Aug. 3, 2022

(65) Prior Publication Data
US 2022/0374313 A1   Nov. 24, 2022

Related U.S. Application Data

(63) Continuation of application No. PCT/JP2020/007030, filed on Feb. 21, 2020.

(51) Int. Cl.
*G06F 11/14* (2006.01)

(52) U.S. Cl.
CPC .................. *G06F 11/1448* (2013.01)

(58) Field of Classification Search
CPC ................................... G06F 11/1448
USPC ........................................ 711/162
See application file for complete search history.

(56) References Cited

U.S. PATENT DOCUMENTS

| | | |
|---|---|---|
| 2012/0209515 A1 | 8/2012 | Klooster |
| 2013/0132522 A1* | 5/2013 | Ruppin ............... B64D 45/0015 709/219 |
| 2014/0316613 A1 | 10/2014 | Jang et al. |

(Continued)

FOREIGN PATENT DOCUMENTS

| | | |
|---|---|---|
| JP | 3469343 | 11/2003 |
| JP | 2012-166779 | 9/2012 |
| JP | 2014-213853 | 11/2014 |

(Continued)

OTHER PUBLICATIONS

Extended European Search Report issued May 23, 2023 in corresponding European Patent Application No. 20920631.7.

(Continued)

*Primary Examiner* — Than Nguyen
(74) *Attorney, Agent, or Firm* — Wenderoth, Lind & Ponack, L.L.P.

(57) ABSTRACT

A backup system (100) installed in an airplane comprises a controller (130), storages (140, 150), a detector (120), and an input apparatus (180). The first storage (140) stores a large amount of data needing to be backed up, such as software for on-board equipment and usage information for an entertainment apparatus (160) and a payment apparatus (170). Based on information from the detector (120) and the input apparatus (180), the controller (130) determines/predicts a transition to stable flight and determines a timing at which a backup operation will be carried out. In addition, an interruption of stable flight is predicted/determined and a backup process is interrupted. A priority is decided for each piece of data to be backed up, and a backup order is decided based on the priority. The backup system (100) predicts sections in which stable flight will be possible from meteorological information, etc., and performs backup.

6 Claims, 3 Drawing Sheets

(56) References Cited

U.S. PATENT DOCUMENTS

2016/0260264 A1* 9/2016 Shih .................... G08G 5/0021
2018/0018237 A1   1/2018 Morita

FOREIGN PATENT DOCUMENTS

JP   2015-038688   *  2/2015   ............. G06F 12/16
JP   2015-38688       2/2015

OTHER PUBLICATIONS

International Search Report issued Apr. 7, 2020 in International (PCT) Application No. PCT/JP2020/007030.

* cited by examiner

AIRPLANE FLIGHT DATA BACKUP SYSTEM

TECHNICAL FIELD

The present invention relates to a method for backing up data accumulated in a moving body.

BACKGROUND ART

Patent Literature 1 (Japanese Patent Publication No. 3496343) discloses a method for preserving information from an aircraft sensor of an airplane in a storage apparatus at intervals determined according to flight conditions. This method involves a flight recorder comprising a large number of aircraft sensors attached to the aircraft of the airplane, a signal-processor that extracts information from the sensors, a recording device that records output of the signal-processor, and a control device on which an operation state of the signal-processor is displayed. In the flight recorder, aircraft sensor data extracted at a sampling rate predetermined according to a flight mode is outputted to the recording device.

In an airplane, a large amount of data such as software and operation information for on-board equipment, usage data for an in-flight entertainment system (IFE), in-flight payment history, settings information for the airplane and the on-board equipment, and failure history of the on-board equipment are generated and accumulated in a recording medium during flight. These pieces of data are important data that can be used to manage equipment operation and improve customer service, and need to be backed up from the viewpoint of reliability. Therefore, data is preserved in multiple locations from the viewpoint of redundancy, but conventionally, the process of backing up from a main recording medium to a backup recording medium has been performed on the ground, where the aircraft system is most stable in consideration of data protection and the effect on other functions of the system. While the backup process is being performed, the backup process is given the highest priority in order to shorten backup time. For this reason, there is a risk that use of aircraft systems such as in-flight announcements and lighting control/maintenance functions will be restricted, and other work performed on the ground, such as maintenance, will be hindered. In addition, there is an enormous cost to park the aircraft on the ground, which affects the operating cost.

SUMMARY

A backup system in the present disclosure comprises a first storage and a second storage each configured to store data, a detector configured to obtain flight information (altitude, position, speed, weather, etc.) for an airplane, and a controller configured to receive information from the detector as input. Based on the flight information inputted from the detector, the controller is configured to predict a period during which the in-flight airplane will fly stably, and during this period, data stored in the first storage is backed up into the second storage.

The backup system in the present disclosure backs up important data by effectively utilizing the time when the system load during flight is low. This makes it possible to shorten the total time for maintenance of the airplane on the ground, improve the operational efficiency of the airplane, and reduce the cost for parking.

DESCRIPTION OF EMBODIMENTS

Embodiments shall be described in detail below with reference to the drawings as appropriate. However, more detailed explanation than necessary may be omitted. For example, there may be omissions of detailed explanations of already well-known matter and duplicate explanations for substantially the same configuration. This is to avoid unnecessary redundancy of the following description and to facilitate understanding for those skilled in the art.

It should be noted that the accompanying drawings and the following description are provided in order for those skilled in the art to fully understand the present disclosure, and are not intended to limit the subject matter set forth in the claims.

Embodiment 1

1-1 Backup System Configuration

Figure 1:
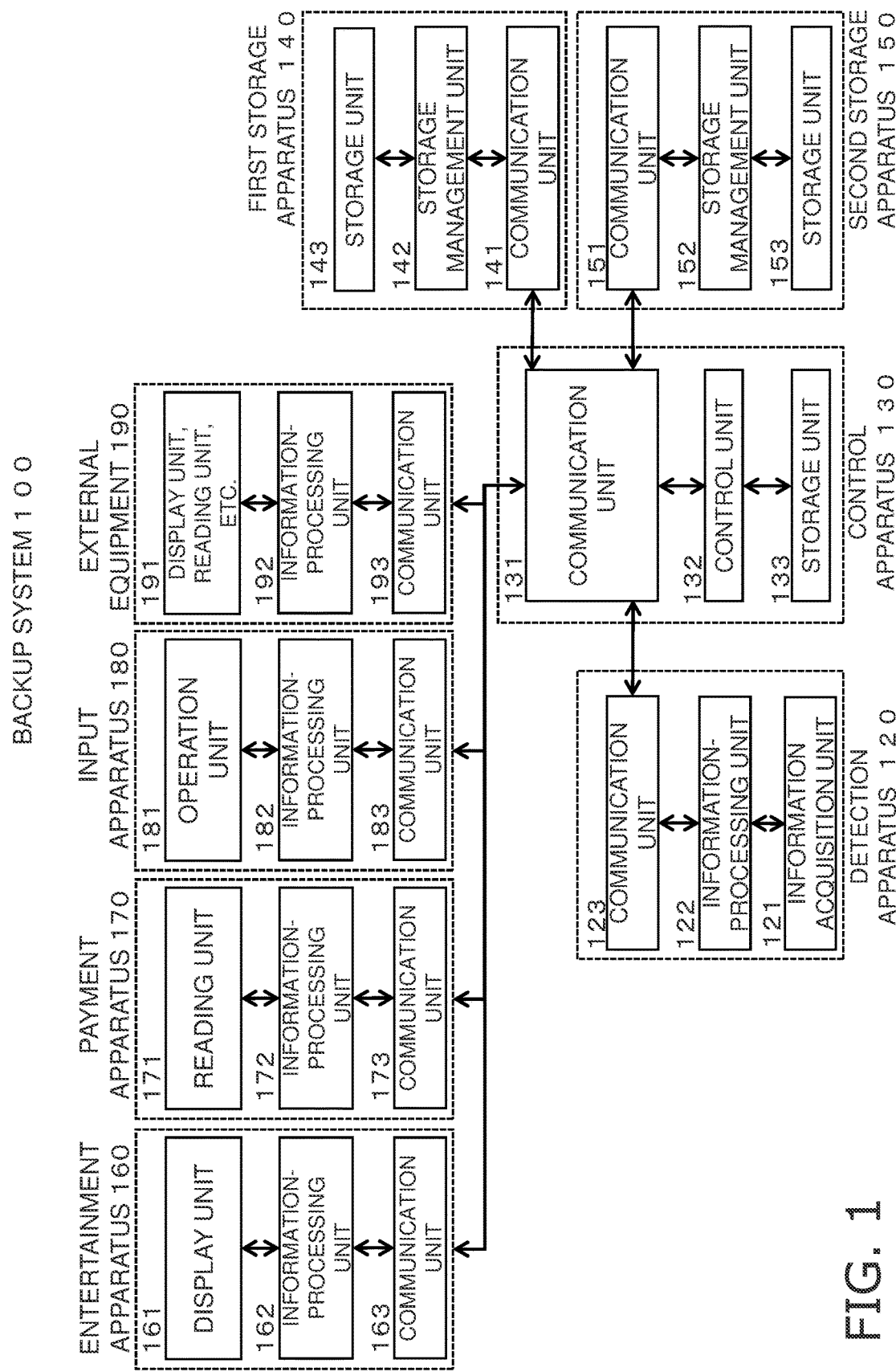
FIG. 1 is a block diagram of a configuration of a backup system in Embodiment 1.

FIG. 1 is a block diagram of a configuration of a backup system according to Embodiment 1. A first storage apparatus 140 and a second storage apparatus 150 that can contain data are connected to a control apparatus 130 that receives, as input, information from a detection apparatus 120 that acquires flight information for an airplane.

The first storage apparatus 140 and the second storage apparatus 150 comprise storage units 143, 153 that store information, storage management units 142, 152 that manage stored information, and communication units 141, 151 that receive output of stored information and new information to be stored. There can also be two or more storage apparatuses. Specific examples of this storage apparatus include a hard disk drive (HDD), a solid state drive (SDD), etc., mounted in the airplane, but the storage apparatus may be any electronic device that can store information. Specific examples of the storage units include hardware that actually preserves electronic information such as disks and memories that configure HDDs and SSDs, specific examples of the storage management units include chips and firmware that control storage units such as the disks and memories mentioned above, and specific examples of the communication units include, inter alia, interfaces such as SATA, Ethernet®, and optical communication used when the above-mentioned HDD and SSD communicate with other devices.

The detection apparatus 120 includes an information acquisition unit 121 attached to the airplane, a signal-processing unit 122 that extracts information from sensors at a predetermined sampling rate, and a communication unit 123 that outputs the information extracted by the information acquisition unit to the control apparatus 130. There may be a plurality of detection apparatuses 120 depending on the type of information the information acquisition unit 121 can acquire. Specific examples of this detection apparatus include an altimeter, an airspeed indicator, a goniometer, meteorological radar, bearing information, position information, etc., installed in the airplane, but the detection apparatus may be any device that can acquire information from the aircraft or from an external source. Specific examples of the information acquisition unit include components, circuits, and software that actually acquire information in various detection units, specific examples of the signal-processing unit include components, circuits, and software tasked with processes of converting analog information from components and circuits that actually acquire information into digital information, and specific examples of the communication unit include, inter alia, interfaces such as SATA, Ethernet®, and optical communication used when the above-mentioned detection apparatus communicates with other devices.

The control apparatus 130 is provided with a communication unit 131 that communicates the receiving of information from the detection apparatus 120 and/or control information for a storage unit, a control unit 132 that determines a process for received aircraft information and/or control specifics for the storage unit, and a storage unit 133 that stores information from the detection unit and/or information necessary for the control unit 132 to determine the control specifics for the storage apparatuses 140, 150. Specific examples of this control apparatus include a server that manages and controls the previously mentioned storage apparatus and/or detection apparatus installed in the airplane, but the control apparatus may be any device that manages and controls the previously mentioned storage apparatus and/or detection apparatus installed in the airplane. Specific examples of the storage unit include an HDD, an SDD, etc., built into a server which temporarily preserves information from various detection units and in which route information, flight plans, passenger information, system information, etc., is preserved. Specific examples of the control unit include software and processing apparatuses such as a CPU that makes a backup determination on the basis of input from the detection apparatus and/or input of information kept in the storage unit. Specific examples of the communication unit include, inter alia, interfaces such as SATA, Ethernet®, and optical communication used when the above-mentioned control unit communicates with other devices.

An input apparatus 180 is provided with an operation unit 181 attached to the airplane, an information-processing unit 182 that acquires and processes a condition of the operation unit, and a communication unit 183 that outputs the condition of the operation unit to the control apparatus 130. Specific examples of the operation unit include a switch, a button, a lever, etc.

1-2 Operations

The following is a description of operations of a backup system 100 configured as described above. The backup system 100 acquires flight information, determines/predicts stable flight based on the flight information, and backs up information preserved in the storage apparatuses. These operations are described below.

[1-2-1 Acquiring Flight Information]

Flight information is acquired by the detection apparatus 120 attached to the airplane. The airplane is provided with various detection units such as an airspeed indicator, an altimeter, a compass, GPS, and meteorological radar. In the present backup system, the control apparatus 130 acquires flight information according to a predetermined sampling rate.

[1-2-2 Determining/Predicting Stable Flight Based on Flight Information]

Figure 2:
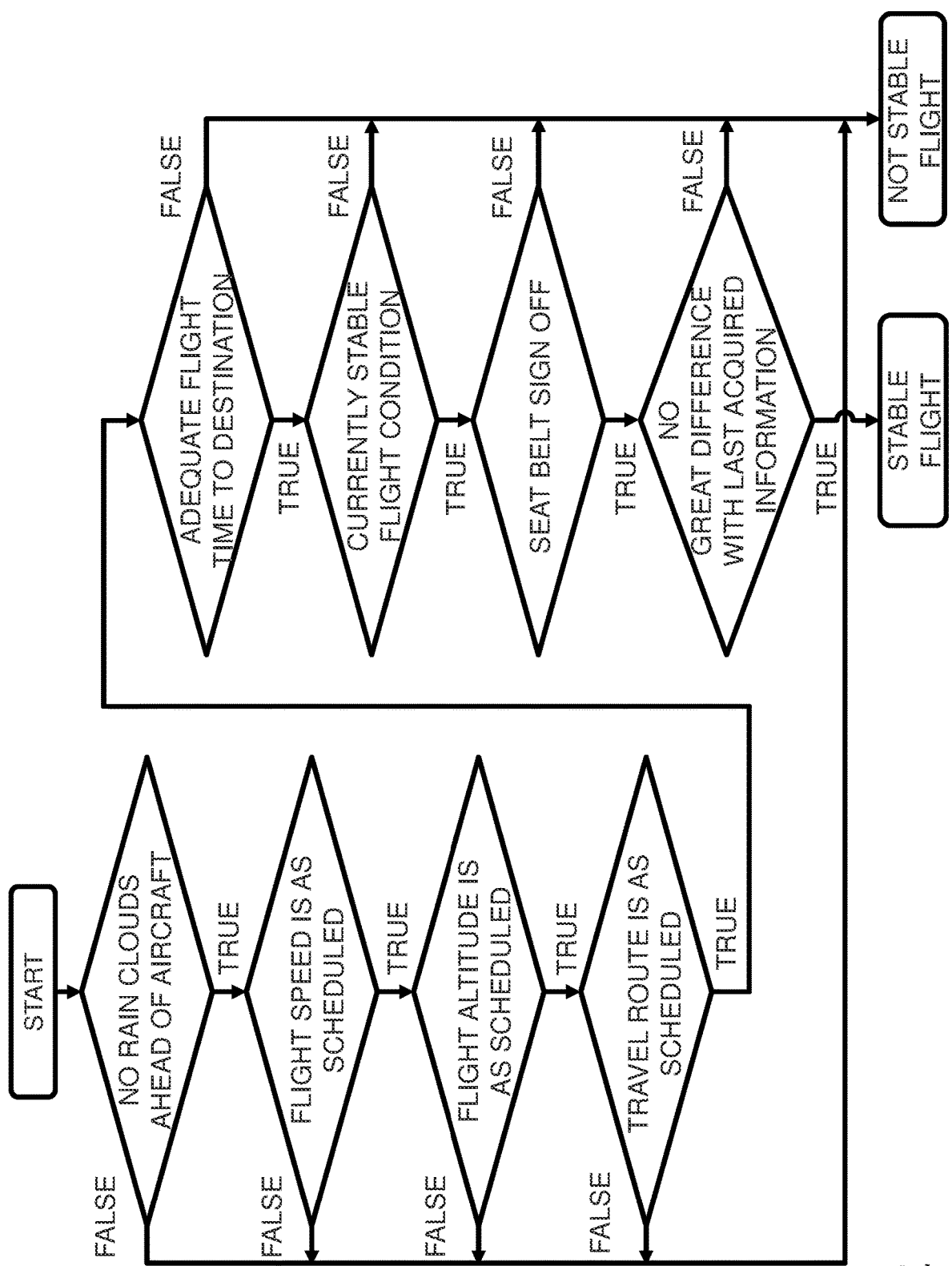
FIG. 2 is a flowchart in which stable flight determination is performed.

FIG. 2 shows an example of a flowchart of determining/predicting stable flight based on flight information. The control apparatus 130 acquires flight information from the detection apparatus 120 at a predetermined sampling rate as mentioned in 1-2-1. Information on weather ahead of the aircraft, the flight speed, flight altitude, flight course, current location information, etc., of the airplane are acquired from the detection apparatus 120. The acquired flight information is compared in the control unit 132 with, inter alia, the illumination status of a seat belt sign set from the input apparatus 180 (such as a switch), according to route information stored in the storage unit 133, previously acquired information, or a determination made by the pilot. It is determined that stable flight can be expected in cases in which: there are few rain clouds in front of the aircraft; the flight speed, flight altitude, and flight course have little difference with the flight plan stored in the storage unit 133; there is sufficient remaining flight time derived from the current position information and the storage unit 133; the seat belt sign has been extinguished at the determination of the captain; and there is no great difference from the previously acquired flight information. When it is determined that stable flight can be expected, the backup operation is continued if the backup operation is in progress, or backup is started if backup has not yet been started or backup has been interrupted.

[1-2-3 Backing Up Information Preserved in Storage Apparatuses]

The storage apparatuses 140, 150 preserve varies pieces of data generated during the flight of the airplane, such as software and operating information for onboard equipment, usage data for an IFE 160, an in-flight payment history, settings information for the airplane and onboard equipment such as the IFE 160, the in-flight payment apparatus 170, the input apparatus 180, and external equipment 190, and failure history for the onboard equipment. When it is determined that stable flight is expected on the basis of input from the detection apparatus 120, the control apparatus 130 backs up to the second storage apparatus 150 data generated while the airplane is in operation and preserved in the first storage apparatus 140.

[1-2-4 Determination that Stable Flight was Hindered]

FIG. 2 shows an example of a flowchart in which a stable flight interruption is determined/predicted based on flight information is performed. The control apparatus 130 acquires flight information from the detection apparatus 120 at a predetermined sampling rate as described in 1-2-1. Information on weather ahead of the aircraft, the flight speed, flight altitude, flight course, current location information, etc., of the airplane are acquired from the detection apparatus 120. The acquired flight information is compared in the control unit 132 with, inter alia, the lighting status of a seat belt sign set from the input apparatus 180 (such as a switch), according to route information stored in the storage unit 133, previously acquired information, or a determination made by the pilot. It is determined that stable flight has been hindered in cases in which: there are rain clouds in front of the aircraft; the flight speed, flight altitude, and flight course are appreciably different from the flight plan stored in the storage unit 133; there is insufficient remaining flight time derived from the current position information and the storage unit 133; the seat belt sign is illuminated at the determination of the captain; and there is an appreciable difference from the previously acquired flight information. When it is determined that stable flight has been hindered, the data backup process is interrupted when the backup operation is in progress, or the backup is not started if backup has not yet been started or backup has been interrupted.

1-3 Effects, Etc

As described above, in the present embodiment, the backup system 100 comprises a first storage apparatus 140 and second storage apparatus 150 that can contain data, a detection apparatus 120 that acquires flight information for the airplane, and a control apparatus 130 that receives information from the detection apparatus as input. The control apparatus 130 predicts stable flight on the basis of information from the detection apparatus 120, and backs up data preserved in the first storage apparatus 140 to the second storage apparatus 150 in accordance with the result of the prediction.

This makes it possible for data backup that had conventionally been performed on the ground due to a high system load to be performed during stable flight having a low system load, and for parking time on the ground to be reduced and operation cost to be reduced. In addition, any adverse effect on the airplane system and on safety can be kept to a minimum by determining that stable flight will be hindered from information such as flight information for the airplane and interrupting information backup.

Embodiment 2

2-1 Backup System Configuration

Figure 3:
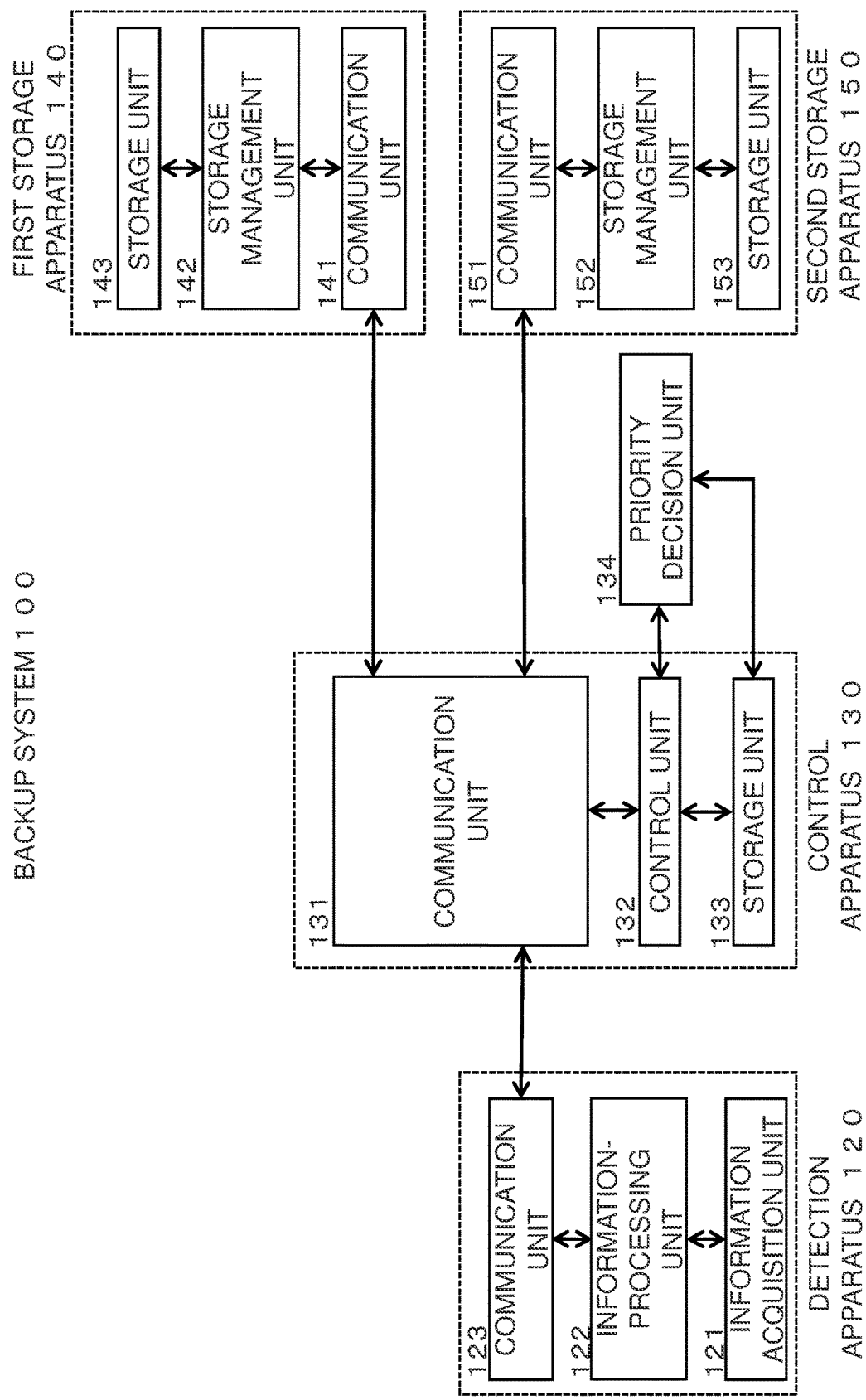
FIG. 3 is a block diagram of a configuration of a backup system in Embodiment 2.

FIG. 3 is a block diagram of a configuration of a backup system according to Embodiment 2. Components having the same function as in Embodiment 1 are represented using the same numerical symbols and shall not be described. The control apparatus 130 is provided with a priority decision unit 134 that decides priority of data to be backed up.

2-2 Operations

As in Embodiment 1, the backup system of Embodiment 2 predicts stable flight on the basis of information from the detection apparatus 120, and in accordance with the result of the prediction, backs up data preserved in the first storage apparatus 140 to the second storage apparatus 150. In the present embodiment, a priority decision unit 134 is provided to decide priority for each piece of data stored in the storage unit 133 depending on what is being backed up, and the control unit 132 prioritizes data given high priority by the priority decision unit over data given low priority among the data stored in the first storage unit, and backs up the prioritized data to the second storage unit.

[2-2-1 Deciding Priority]

One specific method for deciding priority is a "method for duplicating data in descending order of priority," which takes into account priority defined in advance according to the type of data preserved in the storage apparatuses. For example, the highest priority could be set for the failure history of installed equipment, and the lowest priority could be set for usage data for the in-flight entertainment system (IFE). In normal backup, it is often the case that information to be backed up is backed up in order starting with the information having the oldest generation time, but in this case, even if IFE usage data already exists on a recording apparatus and is being backed up, when on-board equipment failure history data has been newly generated and recorded in the recording apparatus, the operation of backing up IFE usage data is interrupted and backup of the data of the on-board equipment failure history is started. Another conceivable method is one in which the type of data serving as a basis for setting priority is distinguished by the equipment or software that generated the data.

Another method is a "method for considering the predicted time required for data backup, the remaining flight time to arrive at the destination, and the predicted time until stable flight is hindered," in which on the basis of route information represented by meteorological radar and GPS and stored in the detection apparatus 120 and the storage unit 133, the remaining flight time until arrival at the destination and the time predicted for backup to be possible until stable flight is hindered are taken into account, and when there is no expectation that backup will be completed within the predicted period in terms of data capacity despite the high priority, backup is performed on the highest priority data for which it is predicted that backup can be completed within the predicted period. The predicted time required for data backup is calculated from the number of files to be backed up, the file size, and a standard transfer rate decided by the software. The transfer rate is derived from the hardware configuration, performance measurement results at the development stage, etc.

Another method is a "method taking account of the period since the last backup was performed for each type of data," in which the data that has passed the longest time since the most recent backup is preferentially backed up when there are multiple pieces of data having the same priority. In addition to the above, there are a "method that takes account of input from the pilot and maintenance personnel," a method that combines these methods, and other methods. The method may be any process that decides priority on the basis of a certain determination material.

[2-2-2 Priority Decision Process]

A priority decision is executed before the airplane takes off, or while the backup process is not being performed, such as when stable flight is being hindered. In cases such as when the priority decision process is performed before takeoff and the backup process was started because the flight became stable after takeoff but was interrupted due to the hindrance of stable flight, during the interruption, the previously mentioned priority decision unit 134 redetermines a backup order that takes account of the latest flight condition of the airplane and the remaining flight time using the method described in 2-2-1.

[2-3-3 Utilizing Priority]

The control unit 132 performs a data backup process on the basis of the priority decided by the priority decision unit 134. When the backup process is interrupted due to a hindrance of stable flight, the priority will be recalculated as described in 2-2-2. When it is determined that stable flight has resumed, the backup process is executed utilizing the priority recalculated by the priority decision unit.

2-3 Effects, Etc

By deciding the priority for each piece of data to be backed up and performing the backup process, important data such as failure information can be preferentially backed up, so that damage due to data loss can be minimized. It is also possible to most effectively utilize the time during stable flight and to perform a stable data backup process by taking account of the remaining flight time of the airplane, the time required for the backup process for each piece of data to be backed up, and the period starting at the time the last backup process was performed.

Other Embodiments

Embodiments 1 and 2 were described above as examples of techniques disclosed in the present application. However, these examples are not provided by way of limitation on the techniques in the present disclosure; the techniques can be applied to embodiments in which changes, replacements, additions, omissions, etc., have been made. In addition, it is also possible to combine the constituent elements described in the above Embodiments 1 and 2 to arrive at a new embodiment.

Other embodiments are given below.

In each of Embodiments 1 and 2, an example in which two storage apparatuses 140, 150 were provided was described as an example of the backup system 100. The backup system may be any system that duplicates the information preserved in one location to another location. Therefore, the backup system may be a system having two or more storage apparatuses, a system using a storage apparatus other than an HDD or SSD, or a storage apparatus in a remote location such as a ground facility. Data redundancy is improved by using a plurality of storage apparatuses. In addition, vibration resistance and high-speed transmission can be ensured by using an SSD, and a large-capacity storage area can be ensured by using an HDD.

In Embodiment 1, an altimeter, an airspeed indicator, a goniometer, meteorological radar, bearing information, position information, etc., installed in the airplane were described as examples of the detection apparatus 120, but as long as the detection apparatus acquires information on the interior and exterior of the airplane, the information, etc., may be obtained wirelessly from a facility on the ground or equipment in satellite orbit. The latest information can be obtained without delay if the detection apparatus is installed in an airplane. A detection apparatus such as a ground facility or satellite equipment can obtain more accurate information and a wider range of information than a detection apparatus installed in an airplane.

In Embodiment 1, a switch installed in the cockpit was described as an example of the input apparatus 180, but as long as the input apparatus can send input to the backup system inside or outside the airplane, the input apparatus may be anything such as a switch, a button, or a lever.

In Embodiment 1, software and operating information for on-board equipment, usage data for the IFE 160, the in-flight payment history, setting information for the airplane and for on-board equipment such as the IFE 160, the in-flight payment apparatus 170, the input apparatus 180, and the external equipment 190, failure history of the on-board equipment, etc., were described as examples of data to be backed up. In addition to these examples, the data to be backed up may be any data generated in the aircraft and that is not temporary data, but is data that must be preserved.

In Embodiments 1 and 2, the control apparatus 130 was described as an example of a controller. The control apparatus may have any physical configuration as long as the control apparatus controls the backup system. If a programmable microcomputer is used, the process details can be changed by changing the program, and the degree of freedom in controller design can therefore be increased. In addition, the controller may be realized as hard logic. Realizing the controller as hard logic is effective in improving processing speed. The controller may be configured of one semiconductor chip or may be physically configured of a plurality of semiconductor chips. When configured of a plurality of semiconductor chips, each control described in the patent claims may be realized as a different semiconductor chip. In this case, one controller could conceivably be configured of the plurality of semiconductor chips. In addition, the controller may be configured of a member (capacitor or the like) having a different function from that of a semiconductor chip. In addition, one semiconductor chip may be configured such that the function of a controller and another function are realized.

The embodiments described above are for exemplifying the techniques in the present disclosure. Therefore, various changes, replacements, additions, omissions, etc., can be made within the scope of the patent claims or the equivalent thereof.

INDUSTRIAL APPLICABILITY

The present disclosure can be applied to a method for managing data of a system comprising a plurality of devices. Specifically, the present disclosure can be applied to a backup system or the like.

EXPLANATION OF REFERENCES

120 Detection apparatus
111 Information acquisition unit
122 Signal-processing unit
123 Communication unit
130 Control apparatus
131 Communication unit
132 Control unit
133 Storage unit
134 Priority decision unit
140 First storage apparatus
141 Communication unit
142 Storage management unit
143 Storage unit
150 Second storage apparatus
151 Communication unit
152 Storage management unit
153 Storage unit
160 Entertainment apparatus
161 Display unit
162 Information-processing unit
163 Communication unit
170 Payment apparatus
171 Reading unit
172 Information-processing unit
173 Communication unit
180 Input apparatus
181 Operation unit
182 Information-processing unit
183 Communication unit
190 External apparatus
191 Display unit/reading unit
192 Information-processing unit
193 Communication unit

The invention claimed is:
1. A backup system, comprising:
a first storage and second storage each configured to store data,
a detector configured to obtain flight information for an airplane,
a controller configured to receive the flight information outputted by the detector as input, and a priority decision unit configured to decide priority on each data stored in the first storage, wherein the controller is configured to predict a period during which the airplane will fly stably based on the flight information inputted from the detector, and to duplicate the data stored in the first storage to the second storage during the period, the first storage stores multiple pieces of data, the controller determines data to be duplicated to the second storage among the multiple pieces of data stored in the first storage, using the flight information inputted from the detector, and the controller is configured to duplicate the data given high priority by the priority decision unit among the data stored in the first storage, preferentially to the second storage, over data given low priority.

2. The backup system as recited in claim 1, wherein the backup system is installed in an airplane, and the controller is configured to generate a duplication plan composed of a data set to be duplicated to the second storage and a duplication order for said data set, from among the multiple pieces of data stored in the first storage, based on the priority and flight data obtained from the detector before the airplane takes off.

3. The backup system as recited in claim 2, wherein during a period in which the airplane is predicted to fly stably based on the flight information inputted from the detector, the controller duplicates the multiple pieces of data stored in the first storage to the second storage according to the duplication plan.

4. The backup system as recited in claim 1, wherein the flight information detected by the detector contains at least one of current position of the airplane, scheduled flight route, estimated arrival time, remaining flight time, flight altitude of the airplane, flight speed, direction of travel, and weather information for the planned flight route.

5. A backup system, comprising:

a first storage and second storage each configured to store data, a detector configured to obtain flight information for an airplane, and a controller configured to receive the flight information outputted by the detector as input, wherein the controller is configured to predict a period during which the airplane will fly stably based on the flight information inputted from the detector, and to duplicate the data stored in the first storage to the second storage during the period, in a period during which it is determined that the airplane will be hindered from flying stably based on the flight information inputted from the detector, the controller interrupts the work of duplicating the data stored in the first storage to the second storage, and after the duplication work has been interrupted, during a period in which the airplane is predicted to fly stably based on the flight information inputted from the detector, the controller is configured to generate a duplication plan composed of a data set to be duplicated to the second storage and a duplication order for said data set, from among the multiple pieces of data stored in the first storage, based on the priority and flight information inputted from the detector.

6. The backup system as recited in claim 5, wherein the flight information detected by the detector contains at least one of current position of the airplane, scheduled flight route, estimated arrival time, remaining flight time, flight altitude of the airplane, flight speed, direction of travel, and weather information for the planned flight route.

* * * * *